US012560351B2

(12) United States Patent
Tovmasyan et al.

(10) Patent No.: US 12,560,351 B2
(45) Date of Patent: Feb. 24, 2026

(54) FIRE RESISTANT MULTI-GUARD LOUVER VENT (MGV)

(71) Applicant: Able Sheet Metal, Inc., Los Angeles, CA (US)

(72) Inventors: Gurgen G. Tovmasyan, Arcadia, CA (US); Michael A. Tovmasyan, Berkeley, CA (US); Victoria L. Tovmasyan, Mountain View, CA (US)

( * ) Notice: Subject to any disclaimer, the term of this patent is extended or adjusted under 35 U.S.C. 154(b) by 403 days.

(21) Appl. No.: 18/169,907

(22) Filed: Feb. 16, 2023

(65) Prior Publication Data

US 2024/0200823 A1 Jun. 20, 2024

Related U.S. Application Data

(60) Provisional application No. 63/387,352, filed on Dec. 14, 2022.

(51) Int. Cl.
*F24F 13/08* (2006.01)
*A62C 2/06* (2006.01)

(52) U.S. Cl.
CPC ............ *F24F 13/082* (2013.01); *A62C 2/065* (2013.01); *F24F 2221/30* (2013.01)

(58) Field of Classification Search
CPC ...... F24F 13/082; F24F 2221/30; A62C 2/065
See application file for complete search history.

(56) References Cited

U.S. PATENT DOCUMENTS

| | | | | |
|---|---|---|---|---|
| 6,848,227 | B2 * | 2/2005 | Whitty | F16L 5/04 52/220.8 |
| 7,413,024 | B1 | 8/2008 | Simontacchi et al. | |
| 8,517,809 | B2 * | 8/2013 | Wexler | F24F 13/082 454/277 |
| 9,822,532 | B2 | 11/2017 | Sherry | |

* cited by examiner

*Primary Examiner* — Allen R. B. Schult
(74) *Attorney, Agent, or Firm* — Phil IP Law Inc.; Narek Zohrabyan; Karen 'Kirk' Galoyan

(57) ABSTRACT

The fire resistant multi-guard louver vent incorporates a staggered angled baffles with an air gap in between them. The air gap is punctuated by a secondary mesh screen connecting the top angled baffle to the angled baffle below it. The primary mesh screen covers part of the frame facing closest to the secondary mesh screen. An intumescent material is applied either to the inside part of the frame, and/or the underside of the angled baffles.

11 Claims, 7 Drawing Sheets

FIRE RESISTANT MULTI-GUARD LOUVER VENT (MGV)

PRIORITY CLAIMS AND CROSS-REFERENCE TO RELATED APPLICATIONS

This application is related to and claims domestic priority benefits under 35 USC § 119(e) from U.S. Provisional Patent Application Ser. No. 63/387,352 filed on Dec. 14, 2022, the entire contents, of the aforementioned application, are expressly incorporated hereinto by reference.

BACKGROUND

The invention relates to ventilation devices integrated with mesh screens and intumescent material.

Different vent configurations exist in the construction industry for installation into structures for aiding the attic or some conduit of a building to better control air flow. Air circulation in these cavities is important for keeping inside of the structure cool or warm, depending on the season.

Some designs in the field allow for greater air flow while others restrict airflow, depending on the particular configuration. For example, a commercially available vent designed by BrandGuard incorporates a staggered "U" shaped baffles which also has a mesh screen on the internal facing side along with intumescent material incorporated within the vent.

Another vent design, incorporates a honeycomb configuration with intumescent material inside of the honeycombs. Intumescent materials are designed to react to heat when fire comes in close proximity to them. Namely, when a high enough heat is in close proximity, these materials swell up, providing a barrier and in closely spaced configurations, even constrict flow of air or other particles. One such vent exists that is marketed under the Vulcan Vent brand as disclosed in U.S. Pat. No. 7,413,024B1.

Yet other designs incorporate filter pads and a screen, as discussed in U.S. Pat. No. 9,822,532B2 where products are marketed under the Embers Out brand.

SUMMARY

In accordance with an aspect of the invention, there is provided a device, including a metallic frame with a front and back opening and angled baffles contained within the metallic frame.

Furthermore, the angled baffles are staggered one on top of the other, with a gap in between each of the angled baffles, such that each angled baffle is secured to two sides of the frame.

Moreover, the angled baffles are oriented in an inverted "V" shape such that the concave part of the inverted "V" shape is facing towards the bottom of the metallic frame.

Additionally, the angle created inside of the concave part of the inverted "V" shape measures 45 degrees.

The device also integrating a primary mesh screen covering the back opening of the frame. Such that the primary mesh screen has openings measuring 1/16 by 1/16 inches or measuring 1/8 by 1/8 inches.

Furthermore a secondary mesh screen is located between any two angled baffles where a gap exists and thereby communicatively connecting those two angled baffles together. The secondary mesh screen has openings measuring 1/16 by 1/16 inches or measuring 1/8 by 1/8 inches.

Moreover, the device can incorporate both a primary mesh screen covering the back opening of the frame and a secondary mesh screen located between any two angled baffles where a gap exists and thereby communicatively connecting those two angled baffles together. Such that the primary mesh screen and/or the secondary mesh screen have openings measuring 1/16 by 1/16 inches and/or openings measuring 1/8 by 1/8 inches.

The device's angled baffles can further have lip sections such that one of the lip sections, that is facing towards the front opening of the metallic frame, incorporates an intumescent material on the inside part of that lip section. In conjunction with that, the front opening of the metallic frame also has a top portion that incorporates an intumescent material on the inside part of that top portion Additionally, only the front opening of the metallic frame has a top portion that incorporates an intumescent material on the inside part of that top portion.

Finally, where the device incorporates an intumescent material, it is of an intumescent tape.

Furthermore, the device incorporates a secondary mesh screen in between the angled baffles and a primary mesh screen covering the back side of the frame.

DESCRIPTION OF THE DRAWINGS

Embodiments in accordance with the present invention are shown in the drawings and will be described below with reference to the figures, whereby elements having the same effect have been provided with the same reference numerals. The following is shown.

DESCRIPTION

The present device is composed of a frame, baffles, a primary mesh screen, a series of secondary mesh screens, and intumescent material.

Figure 1:
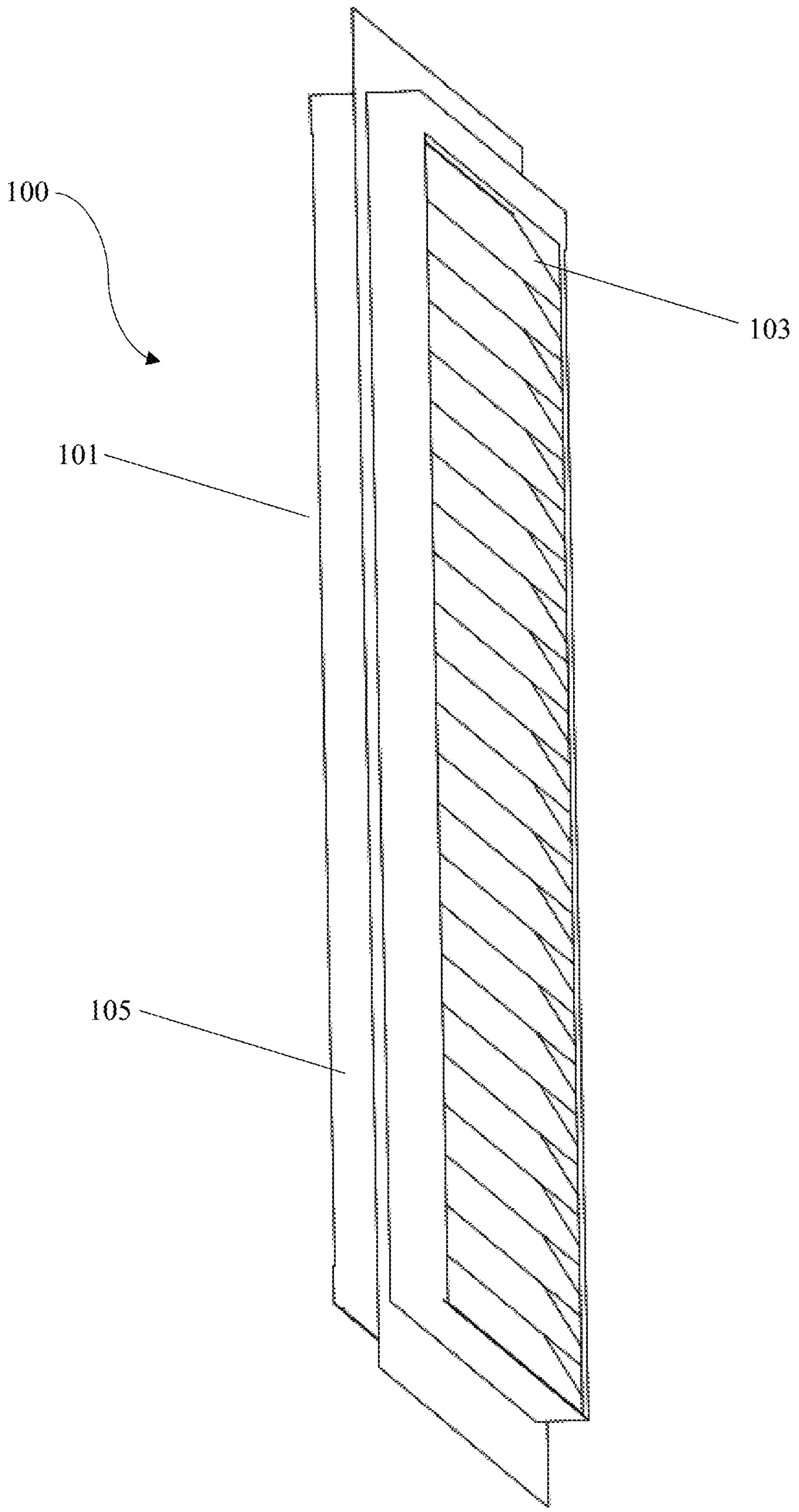
FIG. 1 shows a side perspective view of the fire resistant multi-guard louver vent.

In FIG. 1, the present device 100 is shown in a side perspective view illustrating how the frame 105 and the baffles 103 are configured. The device 100 is composed of a frame 105 that is rectangular in shape, although it can be in various shapes such as a semicircle, triangle, square etc. Whatever the roof type or installation calls for, the shape of the vent can be modified to fit that application. Moreover, depending on the attic wall structure, these shapes can vary in their design to fit into the specified space.

The frame 105 is generally made of some type of metal such as aluminum, steel, or some type of metal alloy. In some instantiations, this material can be some standard material such as 26 gauge ASTMA-653 galvanized steel or ASTM-792 galvalume. The frame 105 is designed to fit into a wall, a roof, roof siding or another similar structure. The frame 105 provides the structural support for incorporating the angled baffles 103. These angled baffles 103 are staggered one on top of the other with a gap (not numerated) in between them allowing air to pass through. This gap can measure up to one inch but is not limited to that opening size. The angled baffles 103 can be made of the same type of material that the frame 105 is able to be made of.

The angled baffles 103 are exposed to the front of the device 100 where as the back 101 of the device 100 points towards inside of the structure the device 100 is installed in. Thus, the viewer does not generally see the back 101 of the device 100 from outside of the structure.

Figure 2:
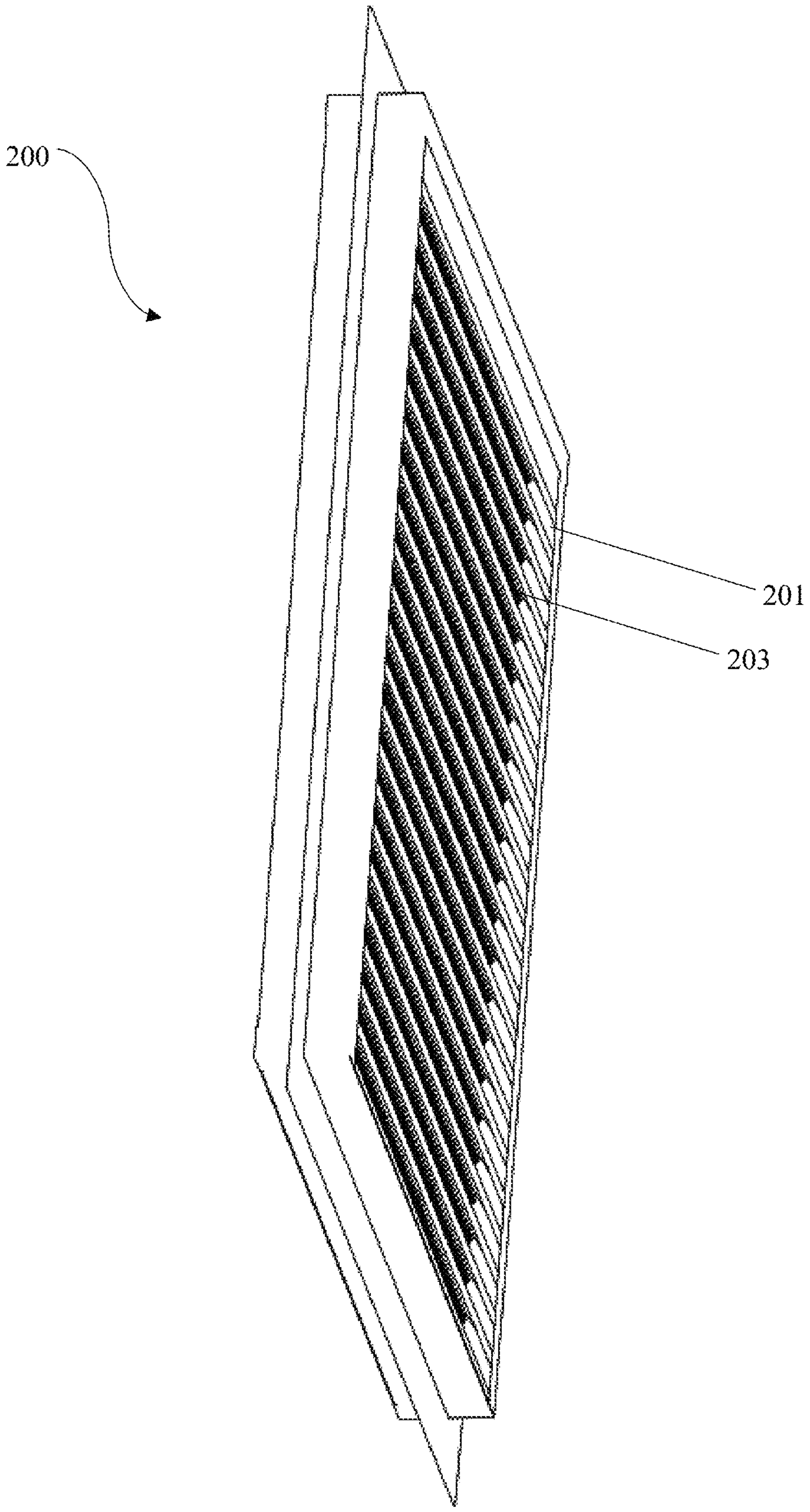
FIG. 2 shows a lower side perspective view of the fire resistant multi-guard louver vent and the air gaps.

In FIG. 2, the present device 200 is shown in a lower side perspective view illustrating how the gap 201, in between the angled baffles 103, are configured. The gap 201 allows for flow of air as the angled baffles 103 redirect them at a certain angle into and through the device 200. Below, the configuration of the angled baffles 103 will be discussed at length. Nevertheless, the gap 201, based on testing conducted per ANSI/AMCA 500-L-07 standards, and 2018 International Building/Residential Code standards, allows for fee air passage of 51.3%.

Furthermore, the secondary mesh screen 203 is shown in between gap 201 that is installed within the device 200 itself. The secondary mesh screen 203 is also incorporated in a staggered configuration as discussed below. The secondary mesh screen 203 can be made of some type of metal with a mesh pattern of ⅛ or 1⁄16 of an inch to allow for adequate airflow. Larger mesh patterns would allow fire embers to pass through the device 200 and too small of a mesh pattern would restrict too much of the air flowing through the device 200. The secondary mesh screen 203 can be made of the same material as the baffles 103.

The secondary mesh screen 203, based on testing conducted per ANSI/AMCA 500-L-07 standards, and 2018 International Building/Residential Code standards, allows for fee air passage of 47.6% for a screen with a 1⁄16×1⁄16-inch opening.

Figure 3:
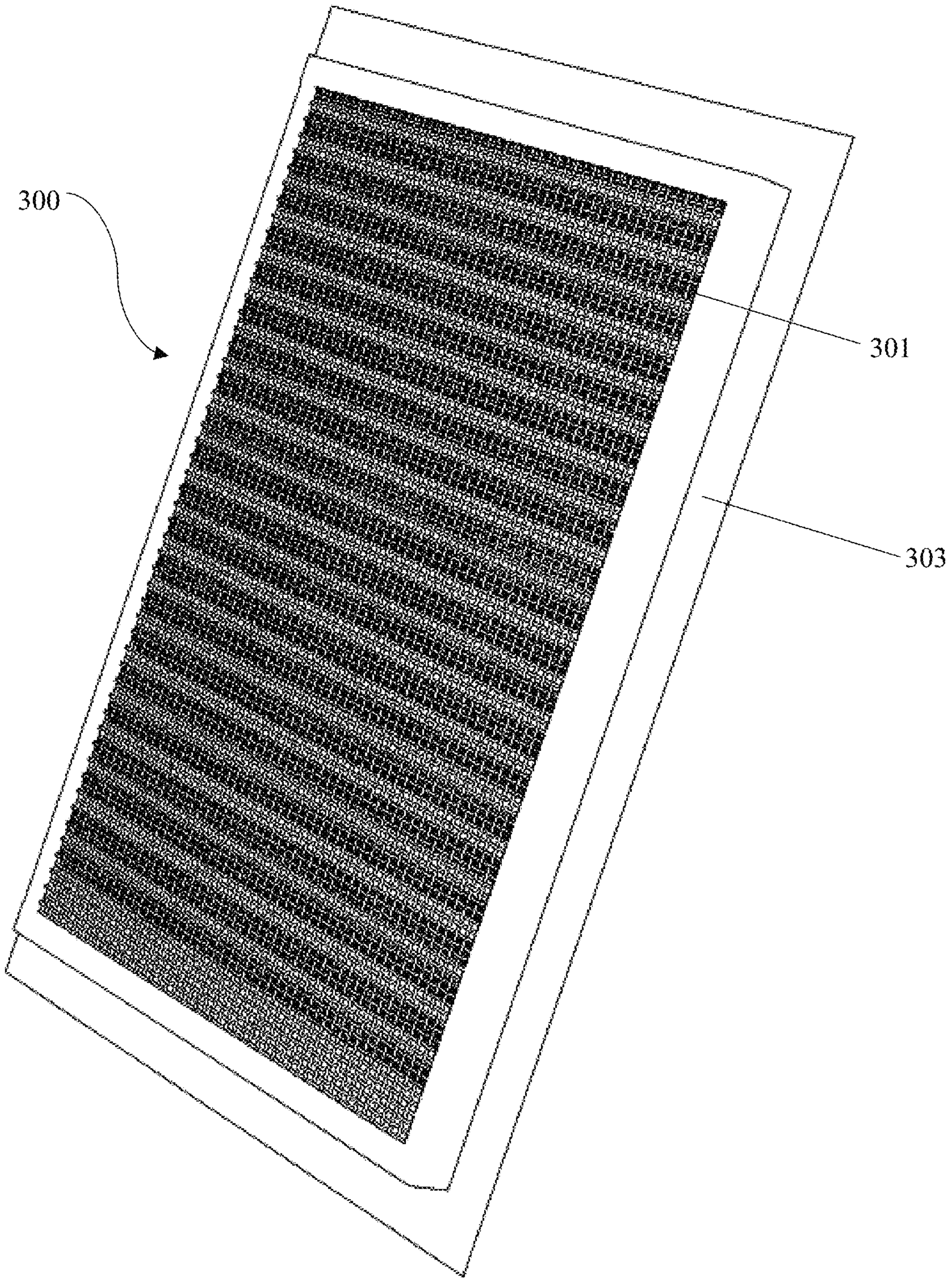
FIG. 3 shows a back-perspective view of the fire resistant multi-guard louver vent with the primary mesh screen.

In FIG. 3, the present device 300 is shown in a back-perspective view illustrating how the primary mesh screen 301 is incorporated into the frame 303. The primary mesh screen 301 can be made of some type of metal with a mesh pattern of ⅛ or 1⁄16 of an inch to allow for adequate airflow. Based on testing conducted per ANSI/AMCA 500-L-07 standards, and 2018 International Building/Residential Code standards, a primary mesh screen 301 with an opening of 1⁄16×1⁄16-inch allows for fee air passage of 36.06%. With an ⅛×⅛-inch opening mesh screen 301 however, the free air flow is measured at 43.72%.

Figure 4:
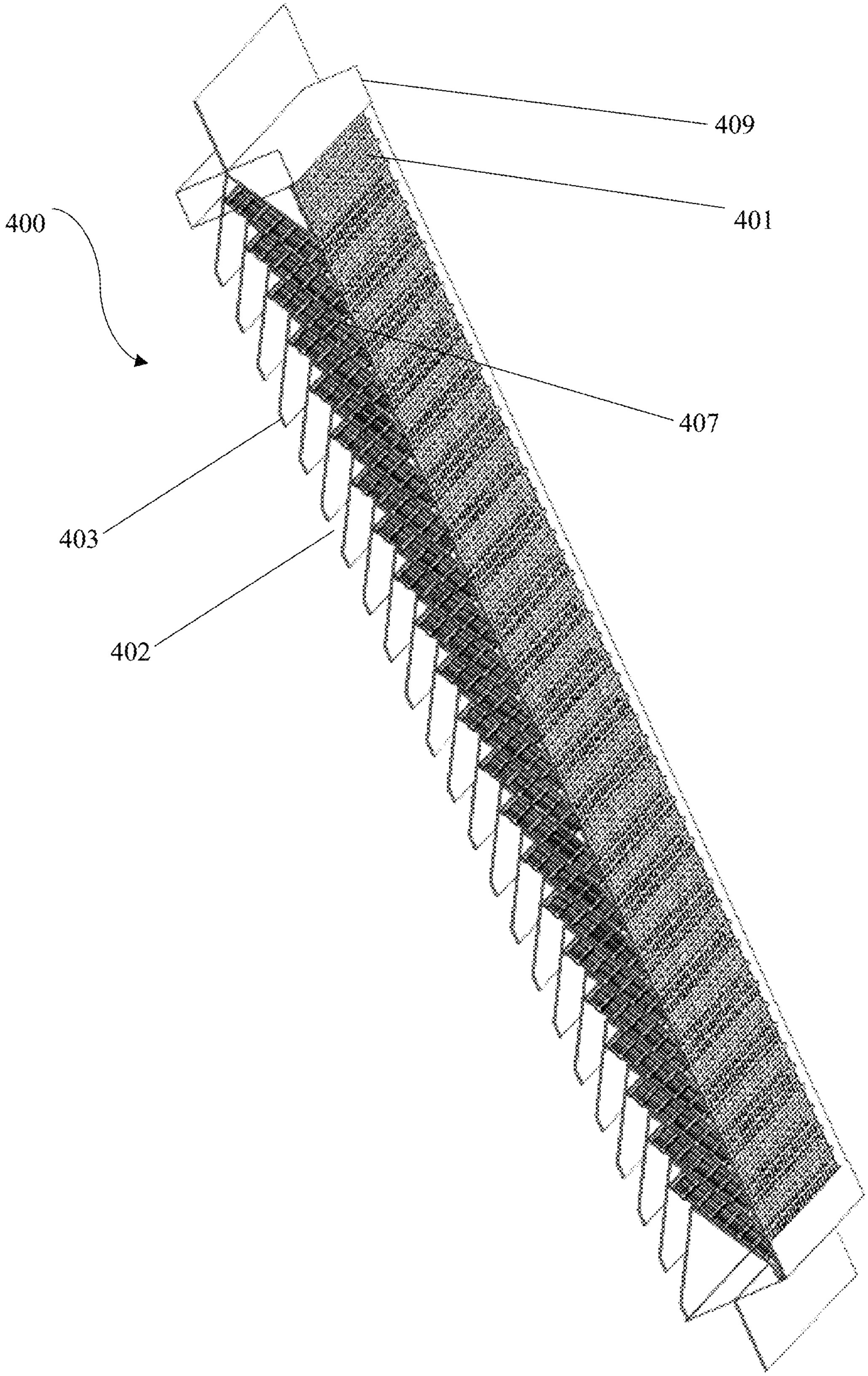
FIG. 4 shows a side-cross sectional view of the fire resistant multi-guard louver vent.

In FIG. 4, the present device 400 is shown in a side-cross sectional view. The primary mesh screen 401 is shown incorporated into the frame 409. The angled baffles 403 are shown staggered inside of the frame 409. The sides of the angled baffles 403 are secured firmly to the inside left and right sides of the frame 409. The top and bottom angled baffles 403 are also secured in place on the top and bottom sides of the frame 409, respectively. These angled baffles 403 are staggered based on an inverted "V" shape, each of which has a 45 degree angle in between the two sides of the "V" shape. However, other patterns are also contemplated by these disclosures.

The secondary mesh screen(s) 407 is/are shown such that it/they sit flush with one half side of the angled baffle 403 (e.g. from the top, the second in the series) and connecting on the edge of the mesh screen 407 to the underside of another half side angled baffle 403 (e.g. from the top, the first in the series). Thus, the secondary mesh screen 407 cuts across the gap 402, at an angle, towards the front side of the device 400.

Figure 5A:
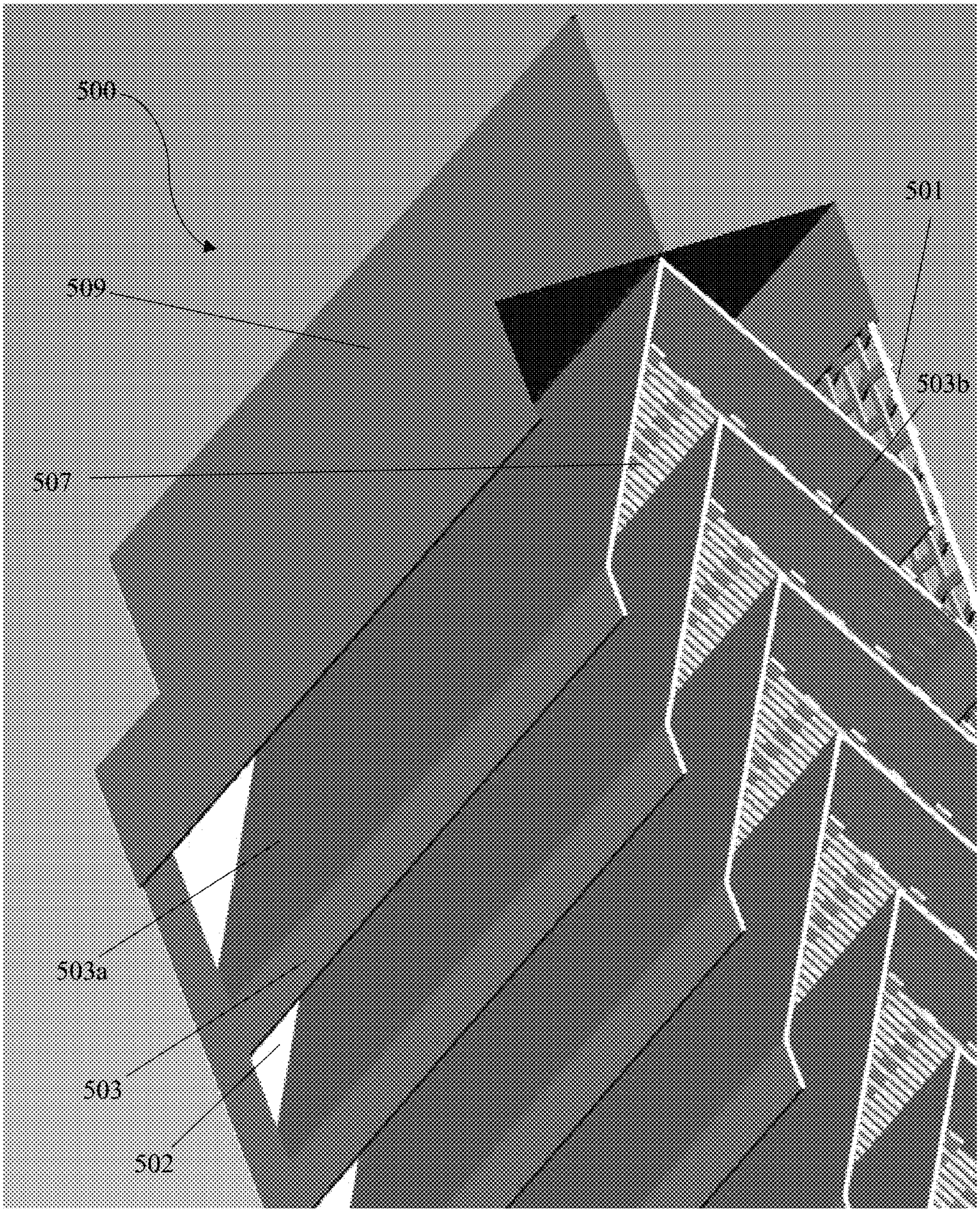
FIG. 5A shows a zoomed in level where a side-cross sectional illustrates configuration of the primary mesh screen and the secondary mesh screens.

In FIG. 5A, the present device 500 is shown as a zoomed in side-cross sectional view, illustrating how the primary mesh screen 501 and the secondary mesh screen 507 are configured. As can be discerned, the secondary mesh screen 507 is secured unto the second half of one of the angled baffles 503 and in particular, on top of the second half 503*b* of the angled baffle 503. The secondary mesh screen 507 furthermore extends to and secures unto the underside of another angled baffle 503, in particular the first half 503*a* of the angled baffle 503. This pattern continues on, in a sequence, inside of the frame 509 with each successive set of angled baffles 503 except for the very top and bottom angled baffles 503.

As can be seen, the gap 502 is punctuated with the secondary mesh screen 507 which permits air to flow through and almost entirely curtails the ability of embers to pass through the device 500. Moreover, in case any loose embers happen to penetrate through the secondary mesh screen 507, they are then blocked by the primary mesh screen 501. By that time, whatever ember happened to flow through, would have been extinguished as they would be redirected through these angled baffles 503 with the resistive barriers of the secondary mesh screen 507 and/or the primary mesh screen 501.

The pairing of the designed angled baffles 503, the secondary mesh screen 507, and the primary mesh screen 501 curtail the ability of embers and radiant heat to affect the structure while maintaining a good air flow to ventilate the structure. It is worthy to note that the combination of the secondary mesh screen 507 and the primary mesh screen 501 are set in such a distance and configuration as to not abate the ability for air to flow freely.

Figure 5B:
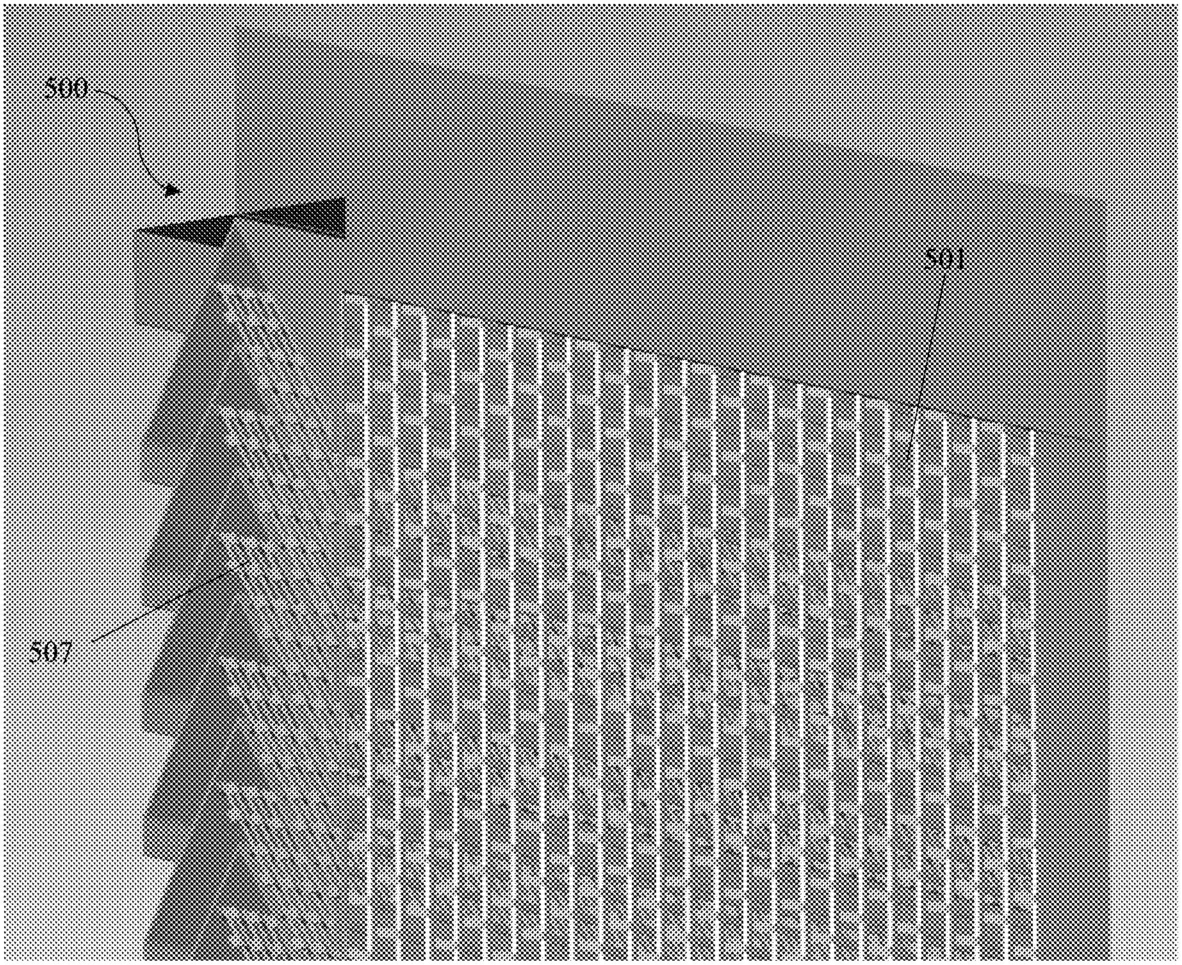
FIG. 5B shows another view of the zoomed in level where a side-cross sectional illustrates configuration of the primary mesh screen and the secondary mesh screens.

In FIG. 5B, the present device 500 is shown from the back at a zoomed in level where a side-cross sectional view illustrates how the primary mesh screen 501 and the secondary mesh screen 507 are configured as discussed above.

Figure 6:
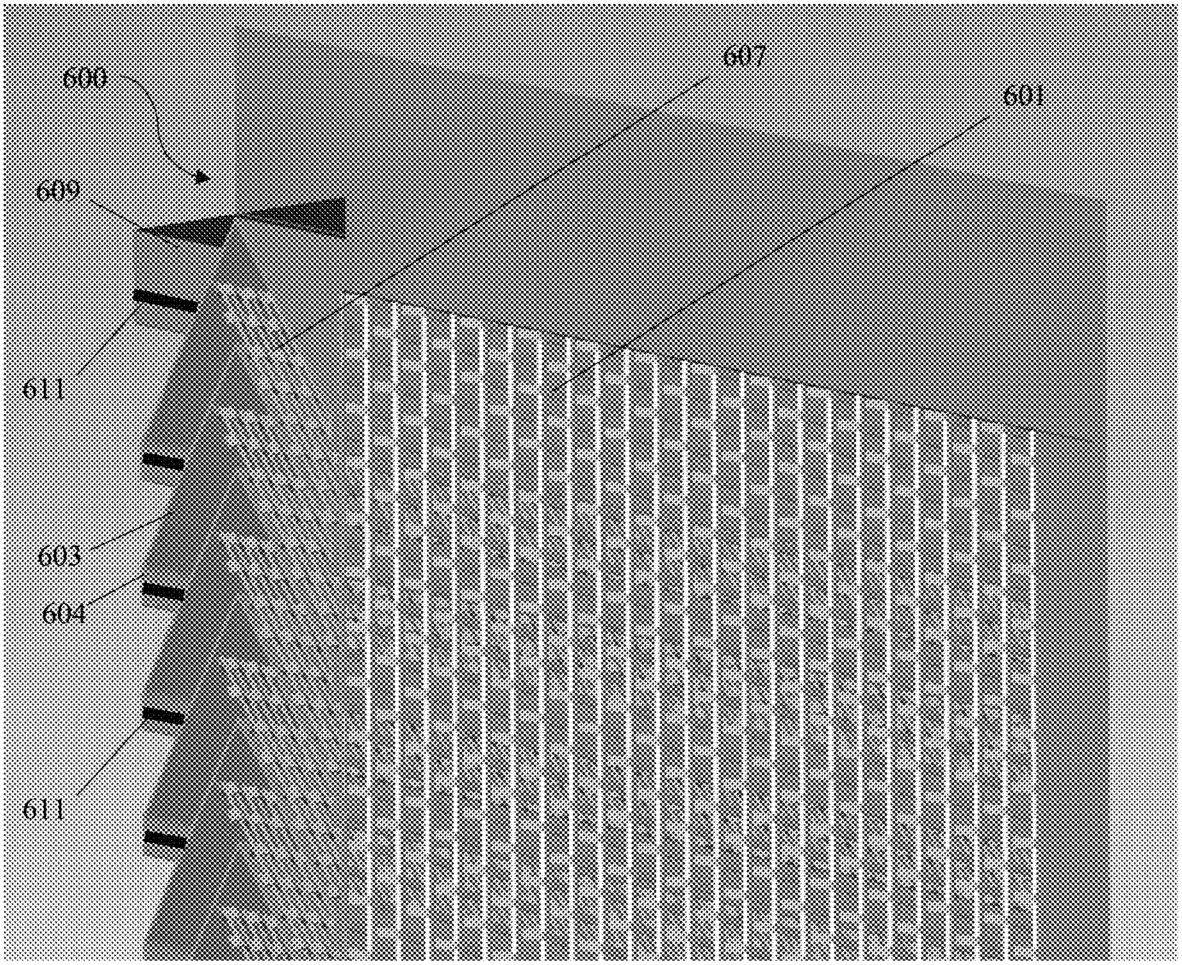
FIG. 6 shows a zoomed in level where a side-cross sectional illustrates where an intumescent material can be incorporated unto.

In FIG. 6, the present device 600 is shown from the back, at a zoomed in level, where a side-cross sectional view illustrates where an intumescent material 611 can be applied on the underside of the frame 609 and/or the underside of the angled baffle 603—specifically to a lip 604 portion of the angled baffle 603. Intumescent material can expand at close proximity to fire or heat, causing constriction of the gap 201 as to cut off the ability of any loose embers that may travel in between the angled baffles 603 and ultimately through the device 600.

In addition, it should be noted that in these embodiments, the present device 600 can incorporate the secondary mesh screen 607 and/or the primary mesh screen 601 and/or the intumescent material 611.

Based on testing compliant with ASTM E2886/E2886M-14 and E2912-17 standards, the device 600 withstood the flame penetration and the ember intrusion test such that no ember intrusion was detected and no ignition or charring occurred compliant with California Building Code, Section 706A.2

Though the present disclosure discusses the vent being placed on a roof or attic, it should be understood that the vent may be placed on any structure or in any area which may require ventilation. This may include between floors within a structure or any other location which would allow for mounting of such a vent and where ventilation may be desired.

Although the present disclosure has been described in detail with reference to certain preferred configurations thereof, other versions are possible. The invention can be utilized in any installation where it would be proper. A person skilled in the art may make many variations and modifications to the disclosed embodiments utilizing functionally equivalent elements to those described herein. Any and all such variations or modifications as well as others which may become apparent to those skilled in the art are intended to be included within the scope of the invention as defined by the appended claims. Therefore, the spirit and scope of the invention should not be limited to the versions described above.

It will be understood by those within the art that, in general, terms used herein, and especially in the appended claims (e.g., bodies of the appended claims) are generally intended as "open' terms (e.g., the term "including should be interpreted as "including but not limited to the term "having should be interpreted as "having at least, the term "comprises' should be interpreted as "includes but is not limited to." etc.)

It should also be understood, that although various compounds, compositions, methods, and devices are described in "open' terms of "comprising." "including," or "having various components or steps (interpreted as meaning "including, but not limited to'), the compounds, compositions, methods, and devices can also "consist essentially of or "consist of the various components and steps, and such terminology should be interpreted as defining essentially closed-member groups. This paragraph is not meant in any way to limit the meaning of "comprising", "having or "including' (and other verb forms thereof), which are to be interpreted as open-ended phrases meaning "including but not limited to consistent with patent law and custom. The intent of this paragraph is merely to indicate that the closed-member groups defined by the "consisting of or "consisting essentially of language are lesser included groups within the open-ended descriptions and to provide Support for claims employing the "consisting of or "consisting essentially of language.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to." "at least and the like include the number recited and refer to ranges which can be Subsequently broken down into Subranges as discussed above. Finally, as will be understood by one skilled in the art, a range includes each individual member. Thus, for example, a group having 1-3 Substituents refers to groups having 1, 2, or 3 Substituents. Similarly, a group having 1-5 substituents refers to groups having 1, 2, 3, 4, or 5 substituents, and so forth.

What is claimed is:

1. A device, comprising:

a metallic frame with a front and back opening;

angled baffles contained within the metallic frame;

wherein the angled baffles are staggered one on top of the other, with a gap in between each of the angled baffles, such that each angled baffle is secured to two sides of the frame;

wherein the angled baffles are oriented in an inverted "V" shape such that the concave part of the inverted "V" shape is facing towards the bottom of the metallic frame; and wherein the angle created inside of the concave part of the inverted "V" shape measures 45 degrees; and a secondary mesh screen located between any two angled baffles, wherein the secondary mesh screen is integrated on top of one half side of the angled baffle and terminates at the underside of another half side angled baffle, where a gap exists, thereby communicatively connecting those two angled baffles together.

2. The device of claim 1, wherein the secondary mesh screen has openings measuring 1/16 by 1/16 inches.

3. The device of claim 1, wherein the secondary mesh screen has openings measuring 1/8 by 1/8 inches.

4. The device of claim 1, further comprising a primary mesh screen covering the back opening of the frame.

5. The device of claim 4, wherein the primary mesh screen and/or the secondary mesh screen have openings measuring 1/16 by 1/16 inches and/or 1/8 by 1/8 inches.

6. The device of claim 1, wherein the angled baffles have lip sections such that one of the lip sections, that is facing towards the front opening of the metallic frame, incorporates an intumescent material on the inside part of that lip section.

7. The device of claim 1, wherein the front opening of the metallic frame incorporates an intumescent material within an underside part of the metallic frame.

8. The device of claim 6, wherein the front opening of the metallic frame incorporates an intumescent material on within an underside part of that the metallic frame.

9. The device of claim 6, wherein the intumescent material is an intumescent tape.

10. The device of claim 8, wherein the intumescent material is an intumescent tape.

11. The device of claim 7, wherein the intumescent material is an intumescent tape.

* * * * *